US012123238B2

(12) United States Patent
Pagnozzi et al.

(10) Patent No.: US 12,123,238 B2
(45) Date of Patent: Oct. 22, 2024

(54) REFRIGERATOR DOOR HINGE WITH HEIGHT ADJUSTABILITY FEATURE

(71) Applicant: ELECTROLUX DO BRASIL S.A., Curitiba (BR)

(72) Inventors: Rodrigo Marge Pagnozzi, Curitiba (BR); Aguilar Da Silva, Curitiba (BR); Alcione Colecha, Curitiba (BR); Alexandre Sauer, Curitiba (BR); Guilherme Rissatto Picanço, Curitiba (BR)

(73) Assignee: Electrolux do Brasil S.A., Curitiba (BR)

( * ) Notice: Subject to any disclaimer, the term of this patent is extended or adjusted under 35 U.S.C. 154(b) by 194 days.

(21) Appl. No.: 17/763,298

(22) PCT Filed: Oct. 2, 2019

(86) PCT No.: PCT/BR2019/050429
§ 371 (c)(1),
(2) Date: Mar. 24, 2022

(87) PCT Pub. No.: WO2021/062498
PCT Pub. Date: Apr. 8, 2021

(65) Prior Publication Data

US 2022/0333417 A1 Oct. 20, 2022

(51) Int. Cl.

| | |
|---|---|
| ***E05D 7/00*** | (2006.01) |
| ***E05D 3/02*** | (2006.01) |
| ***F25D 23/02*** | (2006.01) |

(52) U.S. Cl.
CPC ............. *E05D 7/0027* (2013.01); *E05D 3/02* (2013.01); *F25D 23/028* (2013.01);
(Continued)

(58) Field of Classification Search
CPC ............. F25D 2323/024; F25D 23/028; F25D 2323/021; E05Y 2900/31; E05D 7/081;
(Continued)

(56) References Cited

U.S. PATENT DOCUMENTS

| | | |
|---|---|---|
| 3,389,424 A | 6/1968 | Fellwock |
| 3,430,386 A | 3/1969 | Sadin et al. |

(Continued)

FOREIGN PATENT DOCUMENTS

| | | |
|---|---|---|
| CN | 106895647 | 6/2017 |
| CN | 109154466 | 1/2019 |

(Continued)

OTHER PUBLICATIONS

International Search Report for PCT/BR2019/050429 dated Feb. 12, 2020, 2 pages.

(Continued)

*Primary Examiner* — Hiwot E Tefera
(74) *Attorney, Agent, or Firm* — Pearne & Gordon LLP

(57) ABSTRACT

A refrigerator door hinge pivotably supports first and second doors of a refrigerator for independent movement. The refrigerator door hinge includes a bracket, and first and second arms extending outwards and away from the bracket. The first and second arms are arranged such that a gap is formed therebetween. A first pivot pin is provided for pivotably supporting the first door and is disposed adjacent the first arm. A second pivot pin is provided for pivotably supporting the second door and is disposed adjacent the second arm. An adjustment screw is positioned within a first inner channel of the first pivot pin and is configured to engage a shaft of the first door and to translate within the first inner channel so as to translate the shaft to vertically adjust a height of the first door.

16 Claims, 8 Drawing Sheets

(52) U.S. Cl.
CPC ..... *E05Y 2900/31* (2013.01); *F25D 2323/021* (2013.01); *F25D 2323/024* (2013.01)

(58) Field of Classification Search
CPC .......... E05D 7/0027; E05D 3/02; E05D 3/04; E05D 7/0018
See application file for complete search history.

(56) References Cited

U.S. PATENT DOCUMENTS

| | | | | |
|---|---|---|---|---|
| 3,510,986 | A | 5/1970 | Berkowitz | |
| 4,084,291 | A | 4/1978 | Crowe | |
| 4,609,234 | A | 9/1986 | Naniwa et al. | |
| 5,272,789 | A | 12/1993 | Mitchell et al. | |
| 5,548,869 | A | 8/1996 | Ryczek | |
| 5,896,619 | A | 4/1999 | Koopman | |
| 6,212,734 | B1 | 4/2001 | Commons | |
| 7,490,384 | B2 | 2/2009 | Lee | |
| 7,685,678 | B2 | 3/2010 | Moon et al. | |
| 7,752,709 | B2 | 7/2010 | Moon et al. | |
| 8,166,611 | B2 | 5/2012 | Moon | |
| 8,444,238 | B2 | 5/2013 | Choi | |
| 8,458,858 | B2 | 6/2013 | Neukotter | |
| 8,579,394 | B2 | 11/2013 | Lee et al. | |
| 8,746,006 | B2 * | 6/2014 | Kim | F25D 23/028 16/244 |
| 9,291,385 | B2 | 3/2016 | Hwang et al. | |
| 9,487,980 | B2 | 11/2016 | Pelekanos et al. | |
| 9,556,657 | B2 | 1/2017 | Yi et al. | |
| 9,885,204 | B2 | 2/2018 | Yi et al. | |
| 9,976,328 | B2 | 5/2018 | Kim et al. | |
| 10,080,446 | B2 | 9/2018 | Windich | |
| 10,125,806 | B2 | 11/2018 | Hung | |
| 2006/0143860 | A1 * | 7/2006 | Park | F25D 23/028 16/243 |
| 2009/0038117 | A1 * | 2/2009 | Moon | E05D 7/0027 16/240 |
| 2010/0263403 | A1 * | 10/2010 | Choi | F25D 23/028 62/449 |
| 2011/0140585 | A1 * | 6/2011 | Lee | E05D 7/0027 312/405 |
| 2013/0076222 | A1 * | 3/2013 | Lee | F25D 23/028 16/248 |
| 2013/0154464 | A1 * | 6/2013 | Fiori | E05D 7/0423 16/303 |
| 2013/0249371 | A1 * | 9/2013 | Lively | F25D 23/028 312/405 |
| 2017/0176089 | A1 | 6/2017 | Ramm et al. | |
| 2017/0191736 | A1 | 7/2017 | Fleig et al. | |
| 2018/0169409 | A1 | 6/2018 | Yamashiro | |
| 2018/0187955 | A1 | 7/2018 | Son et al. | |
| 2018/0209190 | A1 * | 7/2018 | Zhang | E05D 5/10 |
| 2021/0095507 | A1 * | 4/2021 | Nakamura | E05D 7/081 |
| 2021/0238900 | A1 * | 8/2021 | Park | E05D 3/02 |

FOREIGN PATENT DOCUMENTS

| | | | | |
|---|---|---|---|---|
| WO | 2013110292 | | 8/2013 | |
| WO | WO-2017203770 | A1 * | 11/2017 | E05D 3/04 |

OTHER PUBLICATIONS

Chinese Office action (English Translation) for Chinese application No. 201980101050.x dated Apr. 26, 2024, 23 pages.

* cited by examiner

REFRIGERATOR DOOR HINGE WITH HEIGHT ADJUSTABILITY FEATURE

CROSS-REFERENCE TO RELATED APPLICATIONS

None

FIELD OF THE INVENTION

This application relates generally to a refrigerator door hinge, and more particularly, a door hinge that pivotably supports first and second doors for independent movement.

BACKGROUND OF THE INVENTION

Conventional refrigeration applications, such as domestic refrigerators, typically have one compartment disposed vertically above another compartment (e.g., a fresh food compartment disposed above a freezer compartment, or vice versa). Each compartment can have a dedicated door pivotably secured to the refrigerator via hinges in order to provide selective access thereto. In some instances, a pair of laterally adjacent doors (e.g., French-type doors) collectively provide selective access to the same compartment (e.g., the fresh food compartment).

Generally, when the pair of doors are installed, it is common for the doors to be misaligned in the vertical direction of the refrigerator. That is, one of the doors will be disposed slightly higher than the other. This requires subsequent adjustment in order to properly align the pair of doors. Traditionally, in order to adjust the alignment of the pair of doors, at least one of the doors must be removed from the refrigerator. This results in added time in order to complete the installation/assembly of the refrigerator. Further, the traditional method of adjusting the alignment of the pair of doors is complex in that it requires one of the doors to be taken off of the refrigerator. As such, an end user (i.e., the consumer) likely cannot perform this adjustment.

BRIEF SUMMARY OF THE INVENTION

In accordance with one aspect, there is provided a refrigerator door hinge that pivotably supports first and second doors of a refrigerator for independent movement. The first and second doors are vertically aligned with and separated from one another. The refrigerator door hinge includes a bracket and first and second arms extending outwards and away from the bracket. The first and second arms are arranged such that a gap is formed therebetween. A first pivot pin pivotably supports the first door and is disposed adjacent the first arm. Further, the first pivot pin includes a first inner channel formed therein. A second pivot pin pivotably supports the second door and is disposed adjacent the second arm. An adjustment screw is positioned within the first inner channel of the first pivot pin. The adjustment screw is configured to engage a shaft of the first door and to translate within the first inner channel so as to translate the shaft of the first door in order to vertically adjust a height of the first door.

In accordance with another aspect, there is provided a refrigerator comprising a cabinet defining a storage compartment therein. First and second doors are vertically aligned with and separated from one another. The refrigerator further includes a first door hinge including a bracket secured to a front face of the cabinet and first and second arms extending outwards and away from the bracket. A first pivot pin pivotably supports the first door. The first pivot pin is disposed adjacent the first arm and has a first inner channel formed therein. A second pivot pin pivotably supports the second door and is disposed adjacent the second arm. An adjustment screw is positioned within the first inner channel of the first pivot pin and is configured to engage a shaft of the first door and to translate within the first inner channel so as to translate the shaft of the first door in order to vertically adjust a height of the first door.

In accordance with yet another aspect, there is provided a method of adjusting a height of a first refrigerator door that is vertically aligned with and separated from a second refrigerator door when both said refrigerator doors are pivotally attached to a single refrigerator. Both of the first and second refrigerator doors are pivotably supported by a door hinge. The door hinge includes first and second arms having first and second pivot pins, respectively, that extend outwards and away from one another. The first and second pivot pins pivotably support the first and second refrigerator doors, respectively. The method comprises the steps of inserting a tool within a gap formed between the first and second arms. A tool is engaged with an adjustment screw that is at least partly positioned within an inner channel of the first pivot pin. The method further includes rotating the tool about a longitudinal axis of the inner channel of the first pivot pin to rotate and translate the adjustment screw within the inner channel in order to vertically adjust a height of the first refrigerator door relative to a height of the second refrigerator door.

DESCRIPTION OF EXAMPLE EMBODIMENTS

Figure 1:
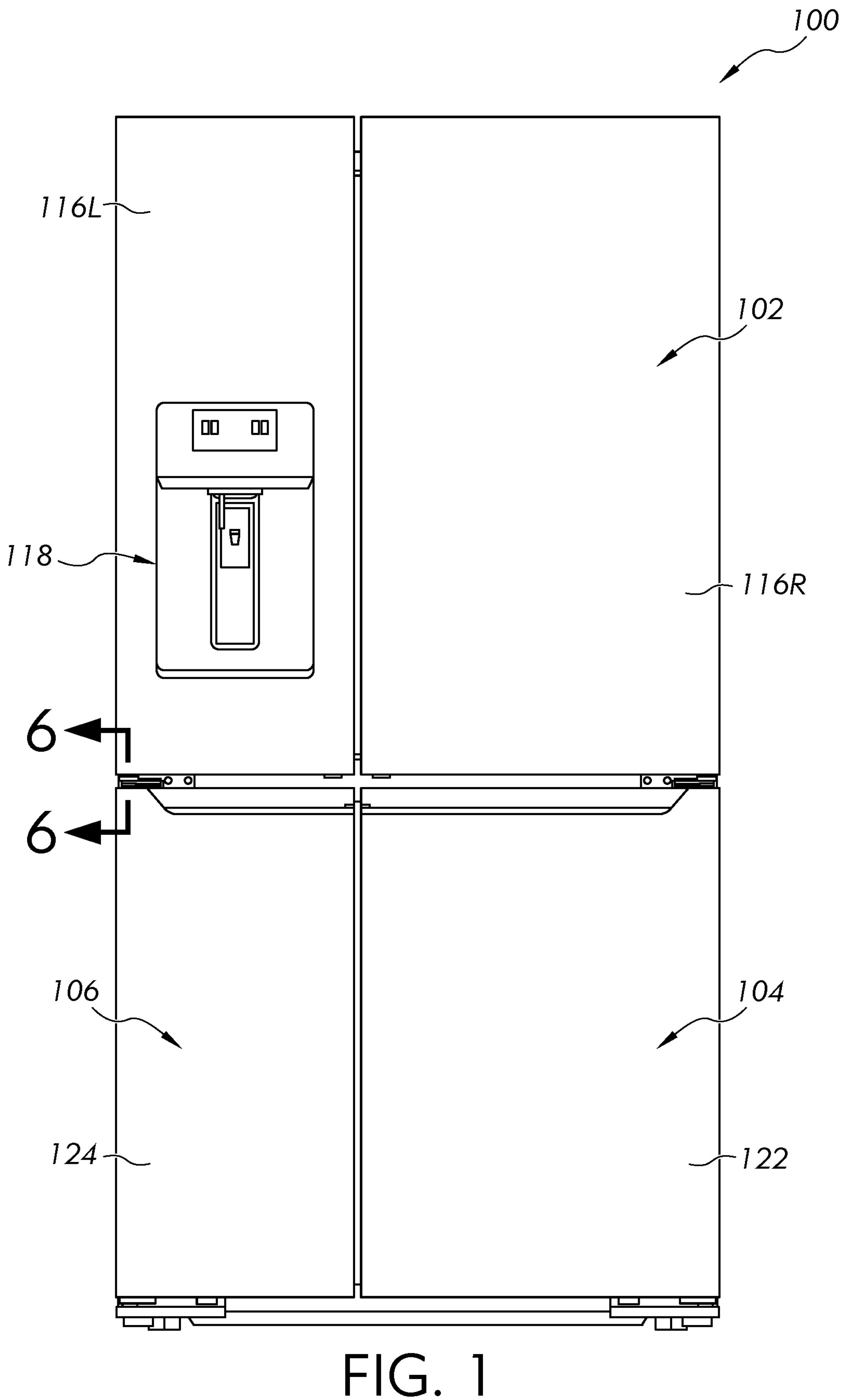
FIG. 1 is a front view of a refrigerator.

Referring now to the drawings, FIG. 1 shows a refrigeration appliance in the form of a domestic refrigerator, indicated generally at 100. Although the detailed description that follows concerns a domestic refrigerator 100, the invention can be embodied by refrigeration appliances other than a domestic refrigerator 100. Further, an embodiment is described in detail below, and shown in the figures as a refrigerator 100, including a fresh food compartment 102 disposed vertically above a freezer compartment 104 and a variable climate zone ("VCZ") compartment 106. It is to be understood that other configurations are contemplated, for example, a top-mount refrigerator (i.e., fresh food compartment disposed vertically below the freezer compartment), a side by side refrigerator (i.e., fresh food compartment disposed laterally adjacent the freezer compartment), etc.

Figure 2:
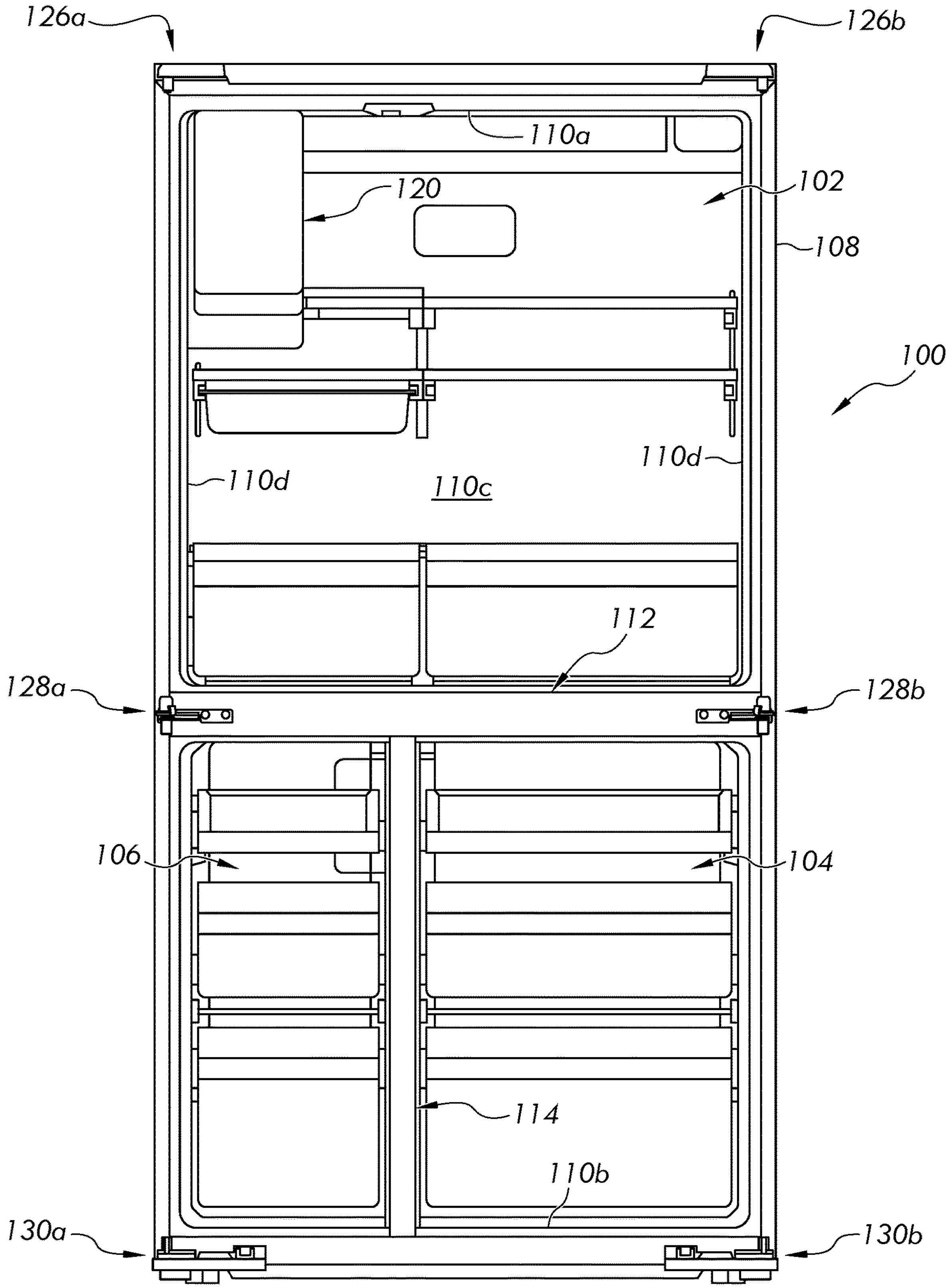
FIG. 2 is a front view of the refrigerator depicted in FIG. 1, with the doors removed.

As shown in FIG. 2, the refrigerator 100 comprises a cabinet that defines a storage compartment therein; the storage compartment comprising the fresh food compartment 102, the freezer compartment 104, and the VCZ compartment 106. The cabinet includes an inner liner that is partially enclosed by a structural outer housing 108. Specifically, the inner liner comprises a top wall 110*a*, a bottom wall 110*b*, a rear wall 110*c*, and a pair of opposing side walls 110*d*.

A horizontal mullion 112 is disposed within the cabinet and is oriented parallel with respect to an imaginary plane on which the top and/or bottom walls 110*a*, 110*b* of the liner lie. The horizontal mullion 112 vertically separates the fresh food compartment 102 from the freezer and VCZ compartments 104, 106. Further, a vertical mullion 114 is disposed within the cabinet and is oriented parallel with respect to an imaginary plane on which the opposing side walls 110*d* of the liner lie. That is, the vertical mullion 114 is perpendicular with respect to the horizontal mullion 112. The vertical mullion 114 separates the freezer compartment 104 from the VCZ compartment 106. Specifically, the vertical mullion 114 separates the freezer and VCZ compartments 104, 106 such that they are positioned laterally adjacent one another (i.e., in a side-to-side direction of the refrigerator 100).

The fresh food compartment 102 serves to minimize spoiling of articles of food stored therein. The fresh food compartment 102 accomplishes this by maintaining the temperature in the fresh food compartment 102 at a cool temperature that is typically above 0° C., so as not to freeze the articles of food in the fresh food compartment 102. It is contemplated that the cool temperature preferably is between 0° C. and 10° C., more preferably between 0° C. and 5° C. and even more preferably between 0.25° C. and 4.5° C.

The freezer compartment 104 is used to freeze and/or maintain articles of food stored therein in a frozen condition. For this purpose, the freezer compartment 104 is in thermal communication with a freezer evaporator (not shown) that removes thermal energy from the freezer compartment 104 to maintain the temperature therein at a temperature of 0° C. or less during operation of the refrigerator 100, preferably between 0° C. and −50° C., more preferably between 0° C. and −30° C. and even more preferably between 0° C. and −20° C.

The VCZ compartment 106 provides a user-adjustable storage area whose temperature can be maintained at either the temperature associated with the fresh food compartment 102 or that of the freezer compartment 104 (or anywhere therebetween). That is, the temperature maintained in the VCZ compartment 106 is adjustable so as to accommodate a wide variety of food articles to be stored therein.

Briefly moving back to FIG. 1, at least one door is associated with each of the fresh food, freezer and VCZ compartments 102, 104, 106 in order to provide selective access to the respective compartment. Specifically, left-hand and right-hand fresh food doors 116L, 116R are arranged to collectively provide selective access to the fresh food compartment 102. That is, the left-hand and right-hand fresh food doors 116L, 116R are disposed laterally adjacent one another such that they are horizontally aligned with one another (i.e., collectively spanning a length of the fresh food compartment 102 between the opposing side walls 110*d* thereof). While it is shown that a pair of French-type doors (i.e., the left and right-hand fresh food doors 116L, 116R) collectively provide selective access to the fresh food compartment 102, it is contemplated that other configurations are possible, for example only a single door that spans the entire length of the fresh food compartment 102 (i.e., in the side-to-side direction between the opposing side walls 110*d* of the liner).

As further shown, a dispenser 118 is provided on one of the fresh food doors (e.g., the left-hand fresh food door 116L) and is configured to dispense liquid water and/or ice pieces upon user request. More specifically, the dispenser receives ice pieces from an ice maker assembly 120 provided in the fresh food compartment 102 (as shown in FIG. 2) and dispenses said ice pieces to an exterior of the refrigerator 100.

A freezer door 122 and a VCZ door 124 are arranged to provide selective access to the freezer and VCZ compartments 104, 106, respectively. As shown, the freezer and VCZ doors 122, 124 are disposed adjacent one another such that they are horizontally aligned with one another. Moreover, the left-hand fresh food door 116L and the VCZ door 124 are disposed and arranged such that they are vertically aligned with (i.e., disposed one above the other) and separated from one another. Similarly, the right-hand fresh food door 116R and the freezer door 122 are disposed and arranged such that they are likewise vertically aligned with and separated from one another.

The dimensions of the left and right-hand fresh food doors 116L, 116R are such that an asymmetrical design is provided. That is, in the embodiment shown in FIG. 1, the right-hand fresh food door 116R has a greater length in the side-to-side direction (i.e., between the opposing side walls 110*d* of the liner) than that of the left-hand fresh food door 116L. Alternatively, the left-hand fresh food door 116L can have a greater length in the side-to-side direction than that of the right-hand fresh food door 116R. In yet a further alternative, the left and right-hand fresh food doors 116L, 116R can have equal lengths in the side-to-side direction (i.e., providing a symmetrical design).

As depicted, the freezer and VCZ doors 122, 124 are each configured to have the same length in the side-to-side direction as that of the left and right-hand fresh food doors 116L, 116R, respectively. However, it is contemplated that the freezer and VCZ doors 122, 124 can have different lengths in the side-to-side direction than those of the left and right-hand fresh food doors 116L, 116R, respectively.

Each of the left and right-hand fresh food doors 116L, 116R, the freezer door 122, and the VCZ door 124 are pivotably attached to the cabinet. That is, as shown in FIG. 2, a pair of top hinges, middle hinges, and bottom hinges are secured to the cabinet. Specifically, first and second top hinges 126*a*, 126*b* are provided at a top portion of the refrigerator and are horizontally separated from one another. That is, the first top hinge 126*a* is provided on a left-hand side of the cabinet and the second top hinge 126*b* is provided on a right-hand side of the cabinet. The first and second top hinges 126*a*, 126*b* are disposed vertically above first and second middle hinges 128*a*, 128*b*, respectively. That is, the first and second middle hinges 128*a*, 128*b* are vertically aligned with (i.e., positioned beneath) the first and second top hinges 126*a*, 126*b*, respectively. Further, first and second bottom hinges 130*a*, 130*b* are provided at a bottom portion of the refrigerator and are disposed vertically below the first and second middle hinges 128*a*, 128*b*, respectively. The first and second bottom hinges 130*a*, 130*b* are likewise vertically aligned with the first and second middle hinges 128*a*, 128*b*, respectively.

The first top hinge 126*a* and the first middle hinge 128*a* collectively permit the left-hand fresh food door 116L to pivot whereas the second top hinge 126*b* and the second middle hinge 128*b* collectively permit the right-hand fresh food door 116R to pivot. The first middle hinge 128*a* and the first bottom hinge 130*a* collectively permit the VCZ door 124 to pivot and the second middle hinge 128*b* and the second bottom hinge 130*b* collectively permit the freezer door 122 to pivot. That is, the left and right-hand fresh food doors 116L, 116R, the freezer door 122, and the VCZ door 124 are all pivotably supported via their respective hinges for independent movement.

Figure 3:
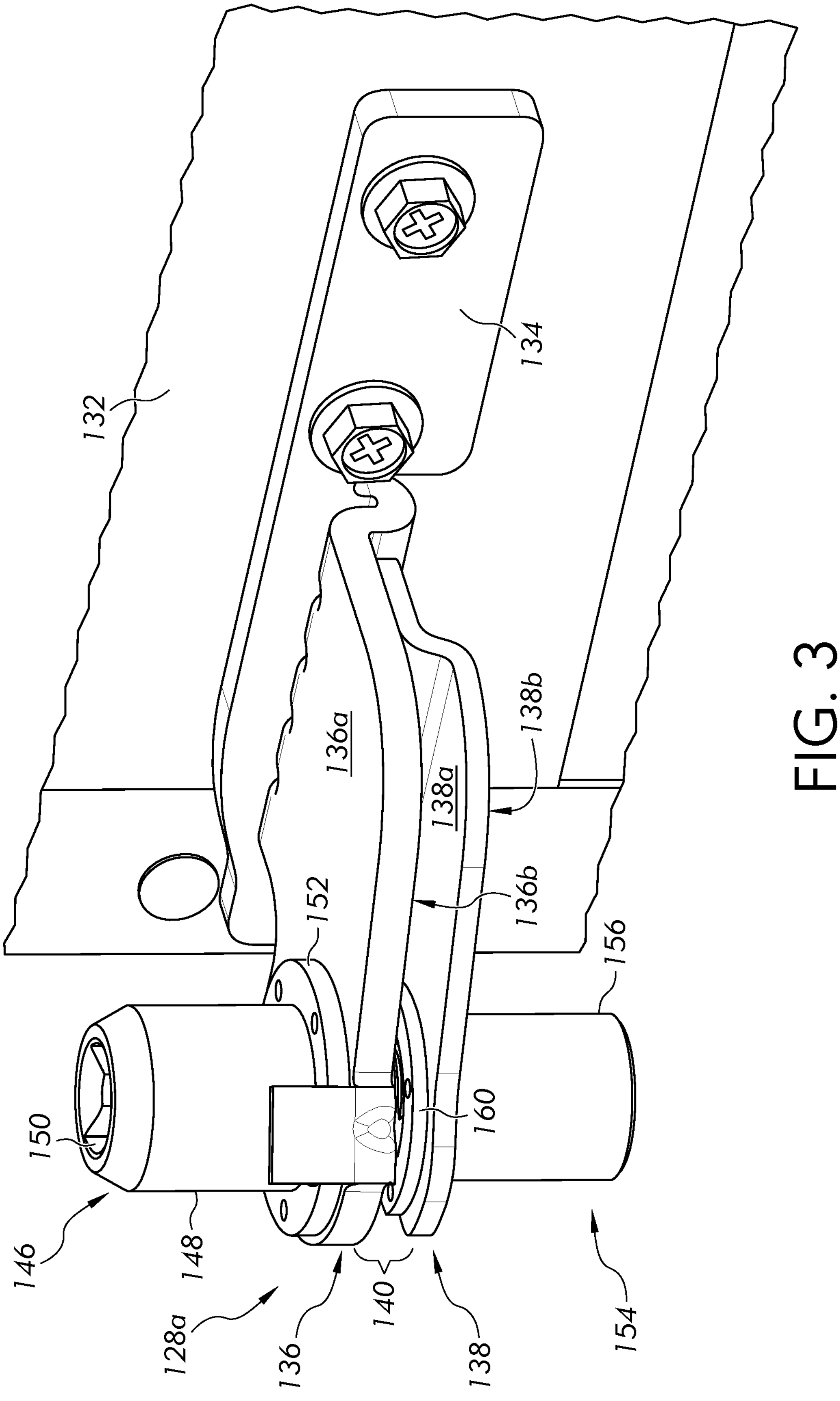
FIG. 3 is a perspective view of a middle hinge of the refrigerator shown in FIG. 2.

The configuration and functionality of the first middle hinge 128*a* will now be discussed. For simplicity, the below disclosure is made with reference to only the first middle hinge 128*a* with the understanding that the second middle hinge 128*b* is configured and functions in a substantially similar manner. With reference to FIG. 3, the first middle hinge 128*a* is shown in an installed state wherein the first middle hinge 128*a* is secured to a front face 132 of the cabinet (e.g., a front face of the horizontal mullion 112 and/or a front face of the outer housing 108).

Figure 4:
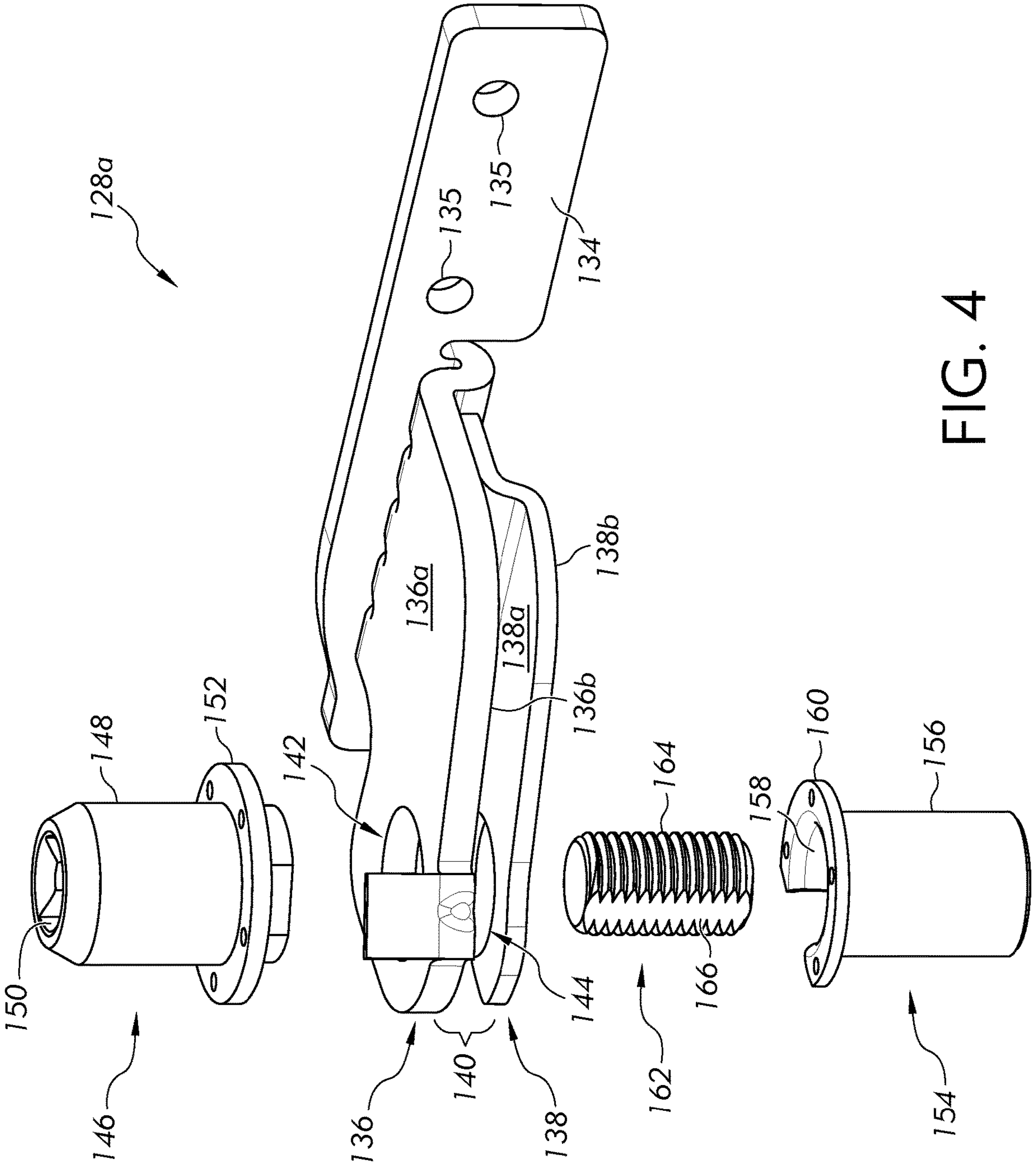
FIG. 4 is an exploded view of the middle hinge depicted in FIG. 3.

Moving on to FIG. 4, the first middle hinge 128*a* is shown in an exploded view. Specifically, the first middle hinge 128*a* comprises a bracket 134 configured to be disposed adjacent and secured to the front face 132 of the cabinet (i.e., as shown in FIG. 3). The bracket 134 includes through-holes 135 formed therein that are configured to accept and retain attachment elements (e.g., screws) in order to secure the bracket 134 to the front face 132 of the cabinet. While FIG. 3 depicts the bracket 134 being secured to the front face 132 of the cabinet via screws, other methods of fixation, known in the art, are likewise contemplated. For example, the bracket 134 may be fixed to the cabinet via welding, soldering, etc.

As further shown in FIG. 4, the first middle hinge 128*a* includes first and second arms 136, 138 that extend outwards and away from the bracket 134. Specifically, each of the first and second arms 136, 138 extend perpendicularly away from the bracket 134. However, it is contemplated that the first and/or second arm 136, 138 need not be perpendicular to the bracket 134 (i.e., they can be provided at an acute or obtuse angle with respect to the bracket 134). In the shown embodiment, the first arm 136 is formed integral with the bracket 134 and the second arm 138 is attached (e.g., via welding, soldering, etc.) to the first arm 136, although this could be vice versa. Alternatively, both the first and second arms 136, 138 can be formed integral with the bracket 134. Further still, both the first and second arms 136, 138 can be formed separate and distinct from the bracket 134 and subsequently attached thereto.

The first arm 136 comprises first and second opposing surfaces 136*a*, 136*b* that are planar and parallel with respect to one another. Likewise, the second arm 138 comprises first and second opposing surfaces 138*a*, 138*b* that are planar and parallel with respect to one another. The first and second arms 136, 138 are arranged such that a gap 140 is formed therebetween. That is, the second surface 136*b* of the first arm 136 faces and is located at a spaced distance from the first surface 138*a* of the second arm 138. More specifically, the first arm 136 is vertically aligned with (i.e., disposed vertically above) the second arm 138 in a manner such that there are no intervening members disposed therebetween.

The first and second arms 136, 138 include first and second through-holes 142, 144 formed respectively therein. That is, the first through-hole 142 extends between the first and second surfaces 136*a*, 136*b* of the first arm 136, and the second through-hole 144 extends between the first and second surfaces 138*a*, 138*b* of the second arm 138. Moreover, the first and second through-holes 142, 144 are coaxial with one another.

The first middle hinge 128*a* further includes a first pivot pin 146 positioned upwardly for pivotably supporting the left-hand fresh food door 116L, as will be explained further below. The first pivot pin 146 is substantially cylindrical in shape, and comprises a hollow body 148 that defines a first inner channel 150 therein. Specifically, the first inner channel 150 is a through-hole extending between terminal ends of the first pivot pin 146. Further, a flange 152 is disposed at or near (e.g., adjacent) a terminal end of the hollow body 148. The flange 152 extends circumferentially outwards from the hollow body 148 and is integrally formed therewith. Alternatively, the flange 152 can be a separate and distinct element with respect to the hollow body 148 that is subsequently attached thereto.

The first middle hinge 128*a* further comprises a second pivot pin 154 positioned downwardly for pivotably supporting the VCZ door 124, as will be further detailed below. Similar to the first pivot pin 146, the second pivot pin 154 is substantially cylindrical in shape, and comprises a hollow body 156 that defines a second inner channel 158 therein. Specifically, the second inner channel 158 is a through-hole extending between terminal ends of the second pivot pin 154. Further, a flange 160 is disposed at or near (e.g., adjacent) a terminal end of the hollow body 156 of the second pivot pin 154. The flange 160 extends circumferentially outwards from the hollow body 156 and is integrally formed therewith. Alternatively, the flange 160 can be a separate and distinct element with respect to the hollow body 156 that is subsequently attached thereto.

Figure 5:
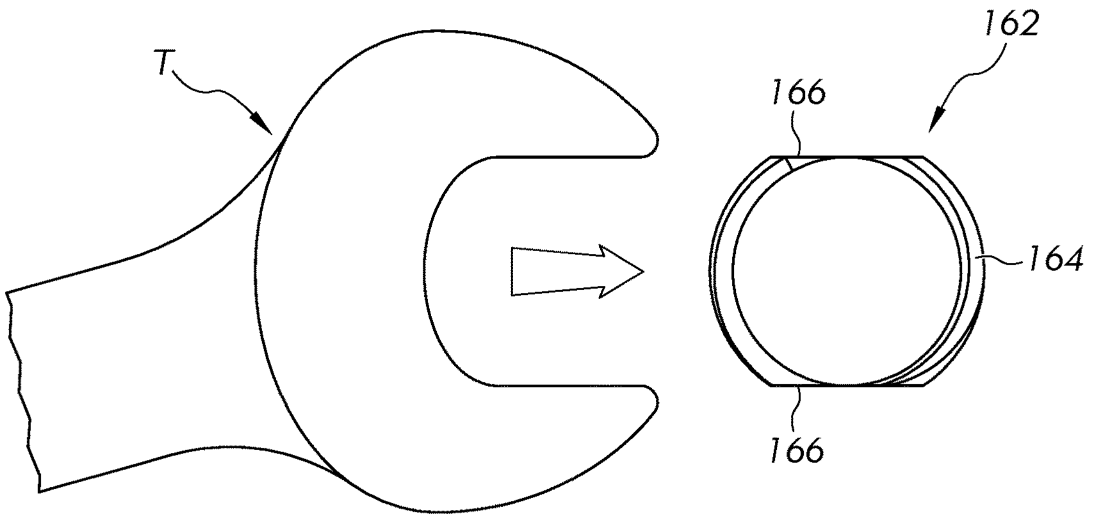
FIG. 5 is a top view of an adjustment screw shown in FIG. 4 and a tool configured to engage/interact with the adjustment screw.

Lastly, the first middle hinge 128*a* includes an adjustment screw 162 comprising a circumferential outer wall having an external thread 164 formed therein. As shown in FIGS. 4 and 5, the adjustment screw 162 includes a pair of planar sides 166 that extend longitudinally along an entire length thereof and interrupt the external threads 164. Alternatively, the pair of planar sides 166 need not extend along an entire length thereof. The pair of planar sides 166 are arranged diametrically opposed to one another (i.e., face away from one another) and are configured to be engaged by a tool T (e.g., a wrench), as will be further detailed below, although it is contemplated that the planar sides could be arranged at various other angles to each other.

Briefly moving back to FIG. 3, when the first middle hinge 128*a* is in an assembled position, the first pivot pin 146 is disposed adjacent the first arm 136. Specifically, the flange 152 of the first pivot pin 146 is positioned above the first arm 136 such that the flange 152 contacts (i.e., rests on) the first surface 136*a* of the first arm 136, and the first pivot pin 146 extends outwards (i.e., upwards) therefrom. The first pivot pin 146 may include a short stub shaft extending below the flange 152 that interfaces with the hole 142. The first pivot pin 146 is fixed to the first surface 136*a* of the first arm 136 (e.g., via welding, soldering, etc.). That is, the first pivot pin 146 does not rotate with respect to the first arm 136. In addition or alternatively, the short stub shaft of the first pivot pin 146 extending below the flange 152 can have a keyed geometry that interfaces with corresponding geometry of the first through-hole 142 to further prevent rotation of the flange 152 relative to the first arm 136.

Further, the second pivot pin 154 is positioned adjacent the second arm 138. That is, the second pivot pin 154 is arranged such that the flange 160 of the second pivot pin 154 contacts the first surface 138*a* of the second arm 138 and the hollow body 156 of the second pivot pin 154 extends through the second through-hole 144 formed in the second arm 138. Said differently, the hollow body 156 of the second pivot pin 154 extends through the second through-hole 144 formed in the second arm 138 and extends outwards (i.e., downwards) therefrom. In this manner, the first and second pivot pins 146, 154 extend outwards and away from one another. Moreover, the second pivot pin 154 is fixed to the first surface 138*a* of the second arm 138 (e.g., via welding, soldering, etc.). That is, the second pivot pin 154 does not rotate with respect to the second arm 138. Preferably, the first and second pivot pins 146, 154 are coaxial with one another when installed upon the bracket 134.

Figure 6:
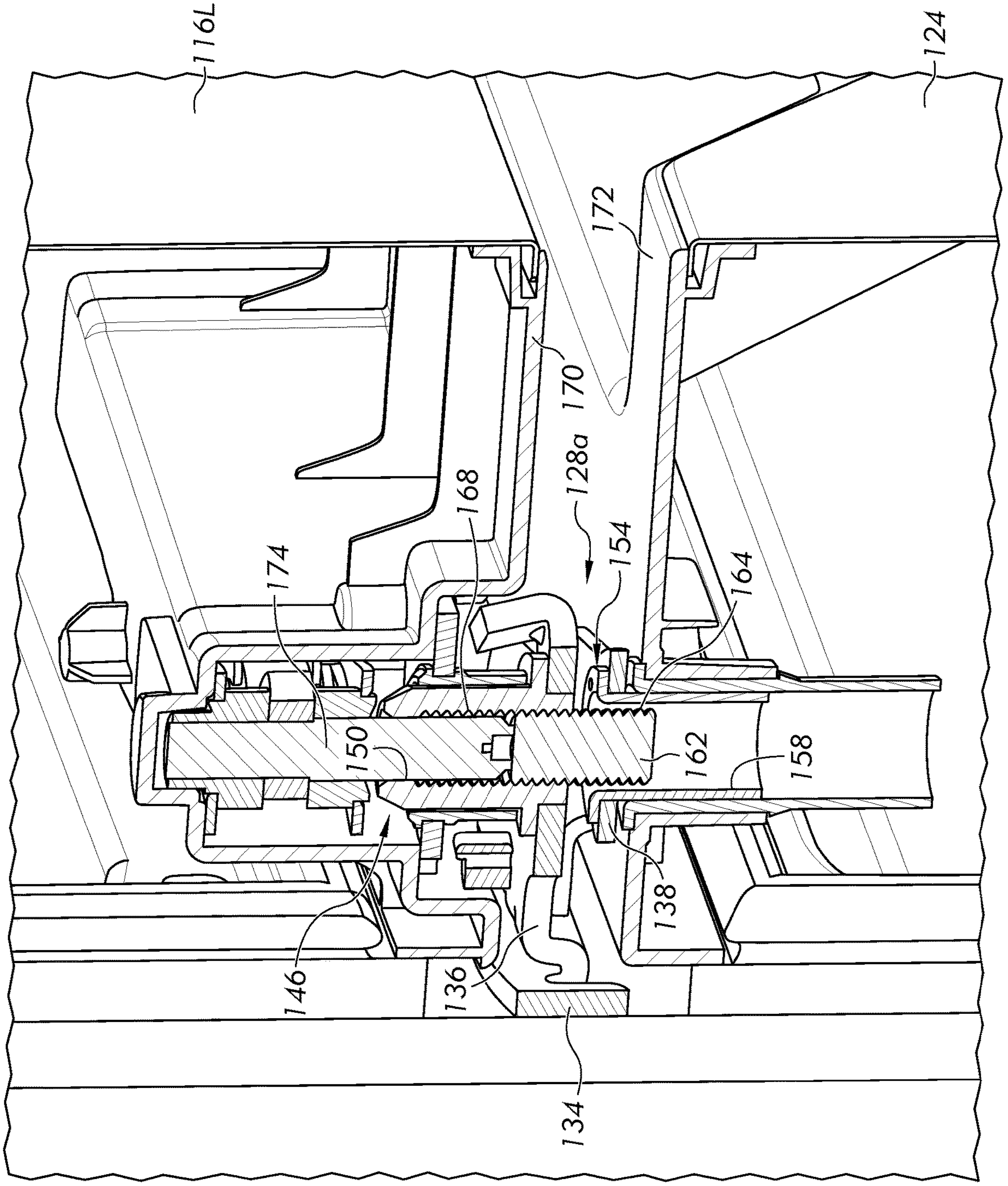
FIG. 6 is a partial, perspective cross-sectional view of the refrigerator depicted in FIG. 1, taken along the line 6-6, illustrating a detail view of the middle hinge.

Moving on to FIG. 6, which is a detail sectional view of the middle hinge 128*a* installed upon the refrigerator 100, the adjustment screw 162 is positioned within the first inner channel 150 of the first pivot pin 146. Specifically, a mating thread 168 is disposed on an inner circumferential surface of the first inner channel 150 and is complimentary to the thread 164 formed on the adjustment screw 162 such that the adjustment screw 162 is held within the first inner channel 150 via mating engagement between the mating thread 168 and the thread 164 formed on the adjustment screw 162. Moreover, due to the mating engagement of the complimentary threads (i.e., between threads 164, 168), as the adjustment screw 162 rotates, the adjustment screw 162 translates axially (i.e., vertically) within the first inner channel 150 of the first pivot pin 146. Due to the close arrangement of parts, the adjustment screw 162 may also be partially received and translate axially within the second inner channel 158 of the second pivot pin 154. To enable this movement, the second inner channel 158 preferably has no threads and an inner diameter relatively greater than that of the adjustment screw 162 to provide clearance.

The adjustment screw 162 extends into the gap 140 defined between the first and second arms 136, 138 and is configured to axially translate within the first inner channel 150 and/or second inner channel 158. Specifically, as will be further detailed below, the gap 140 (see FIGS. 8A-8B) is sized and shaped so as to receive the tool T and permit the tool T to rotate when the tool T engages the pair of planar sides 166 of the adjustment screw 162. Said differently, the gap 140 is configured to provide an access point of sufficient width for the tool T such that a user can engage/adjust the adjustment screw 162 from an exterior of the refrigerator 100.

As further shown, when the left-hand fresh food door 116L is installed on the first middle hinge 128*a*, the first pivot pin 146 is inserted into a bottom casing 170 of the left-hand fresh food door 116L. In this manner, the left-hand fresh food door 116L is pivotably supported by the first middle hinge 128*a* and, more specifically, is pivotably supported by the first pivot pin 146 of the first middle hinge 128*a*. Moreover, when the VCZ door 124 is installed on the first middle hinge 128*a*, the second pivot pin 154 is inserted into a top casing 172 of the VCZ door 124. In this manner, the VCZ door 124 is pivotably supported by the first middle hinge 128*a* and, more specifically, is pivotably supported by the second pivot pin 154 of the first middle hinge 128*a*.

Figure 8A:
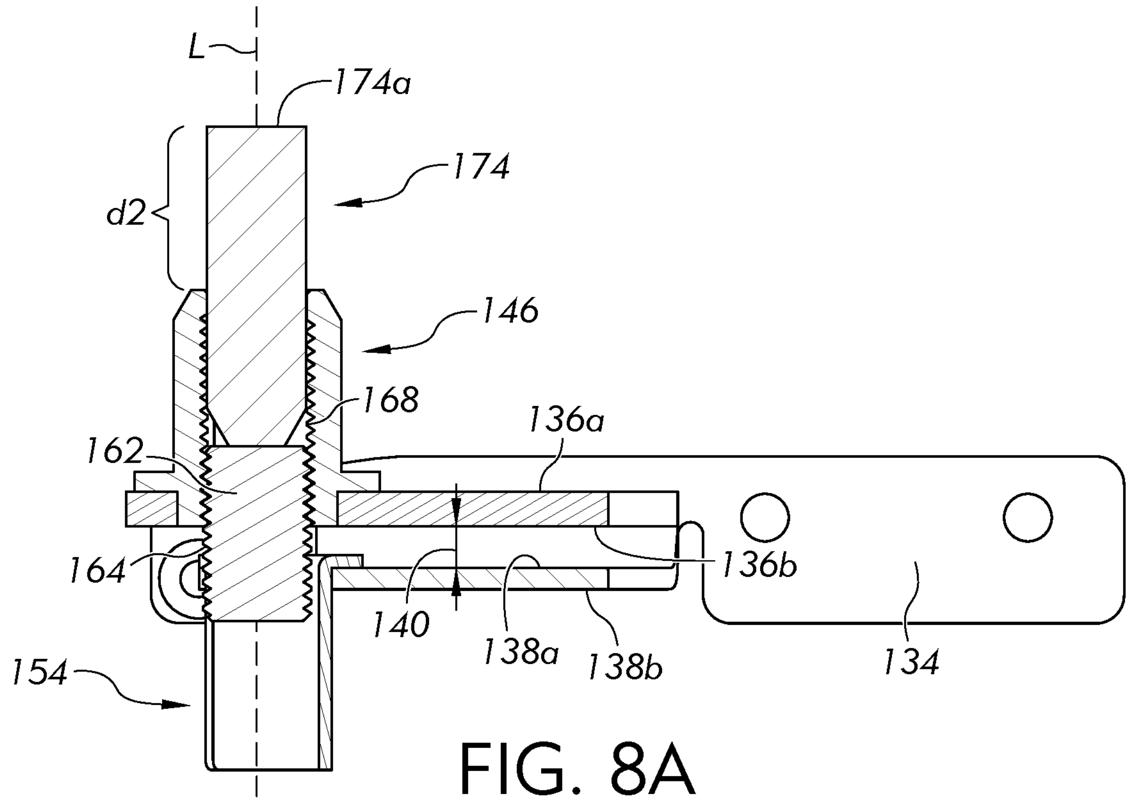
FIG. 8A is a schematic, front cross-sectional view of the middle hinge, wherein a shaft of a door is in a first, unadjusted position.
Figure 8B:
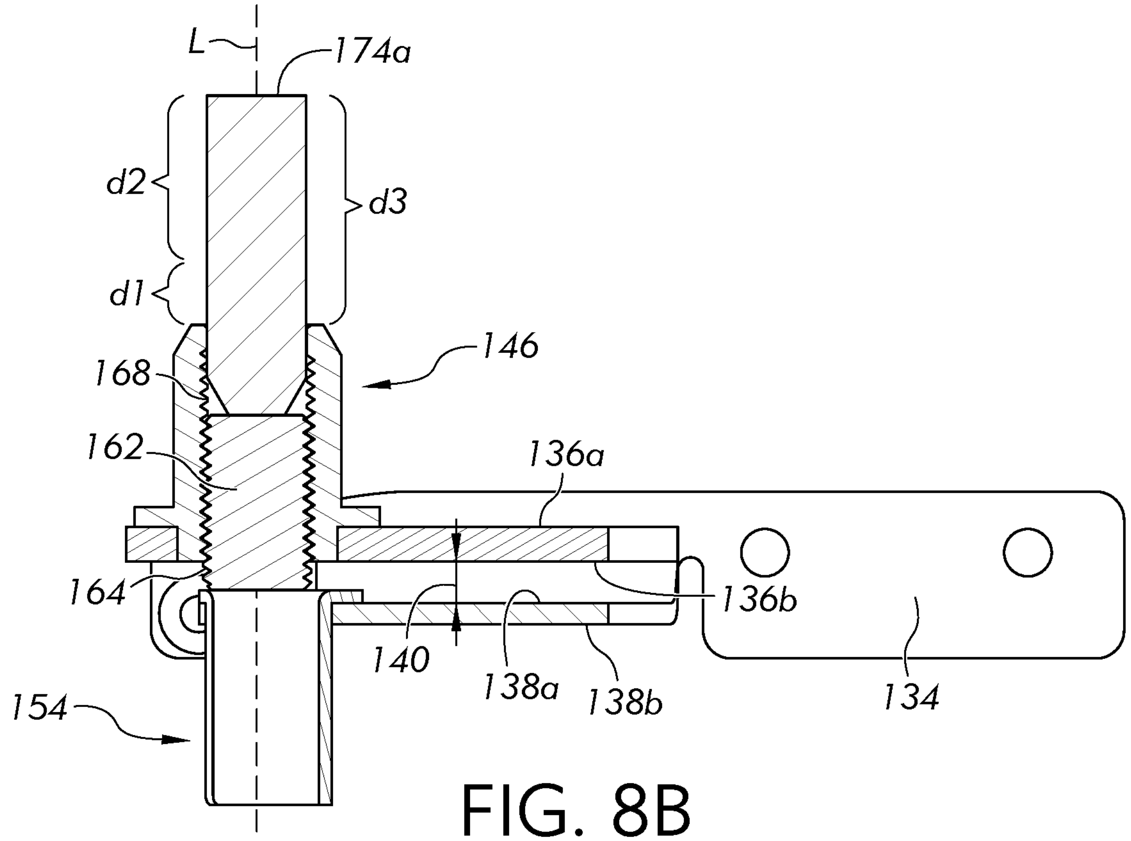
FIG. 8B is a schematic, front cross-sectional view of the middle hinge, wherein the shaft of the door is in a second, adjusted position.

Additionally, when the left-hand fresh food door 116L is installed on the first middle hinge 128*a*, a shaft 174 of the left-hand fresh food door 116L extends within the first inner channel 150 of the first pivot pin 146 and engages (i.e., contacts) the adjustment screw 162, such as at an upper surface thereof. The shaft 174 rotates together with the left-hand fresh food door 116L. In this manner, when the adjustment screw 162 translates axially within the first inner channel 150 of the first pivot pin 146 (i.e., via rotation of the tool T), the shaft 174 of the left-hand fresh food door 116L likewise translates axially (i.e., vertically) within the first inner channel 150 of the first pivot pin 146 (via the translation of the adjustment screw 162) so as to vertically adjust a height of the left-hand fresh food door 116L. As shown in FIGS. 6 and 8A-8B, the mating threads 168 of the first inner channel 150 preferably do not extend the full inner length of the first inner channel 150. Instead, the uppermost portion of the first inner channel 150 can have a conical chamfered end to facilitate reception of the shaft 174 during assembly of the left-hand fresh food door 116L, followed by a length of non-threaded inner wall with a diameter matched and slightly larger than that of the shaft 174 to inhibit angular misalignment of the shaft 174 within the first middle hinge 128*a*.

A method of adjusting a height of the left-hand fresh food door 116L will now be discussed. It is to be understood that the below disclosure likewise applies to adjusting a height of the right-hand fresh food door 116R via the second middle hinge 128*b*.

Figure 7:
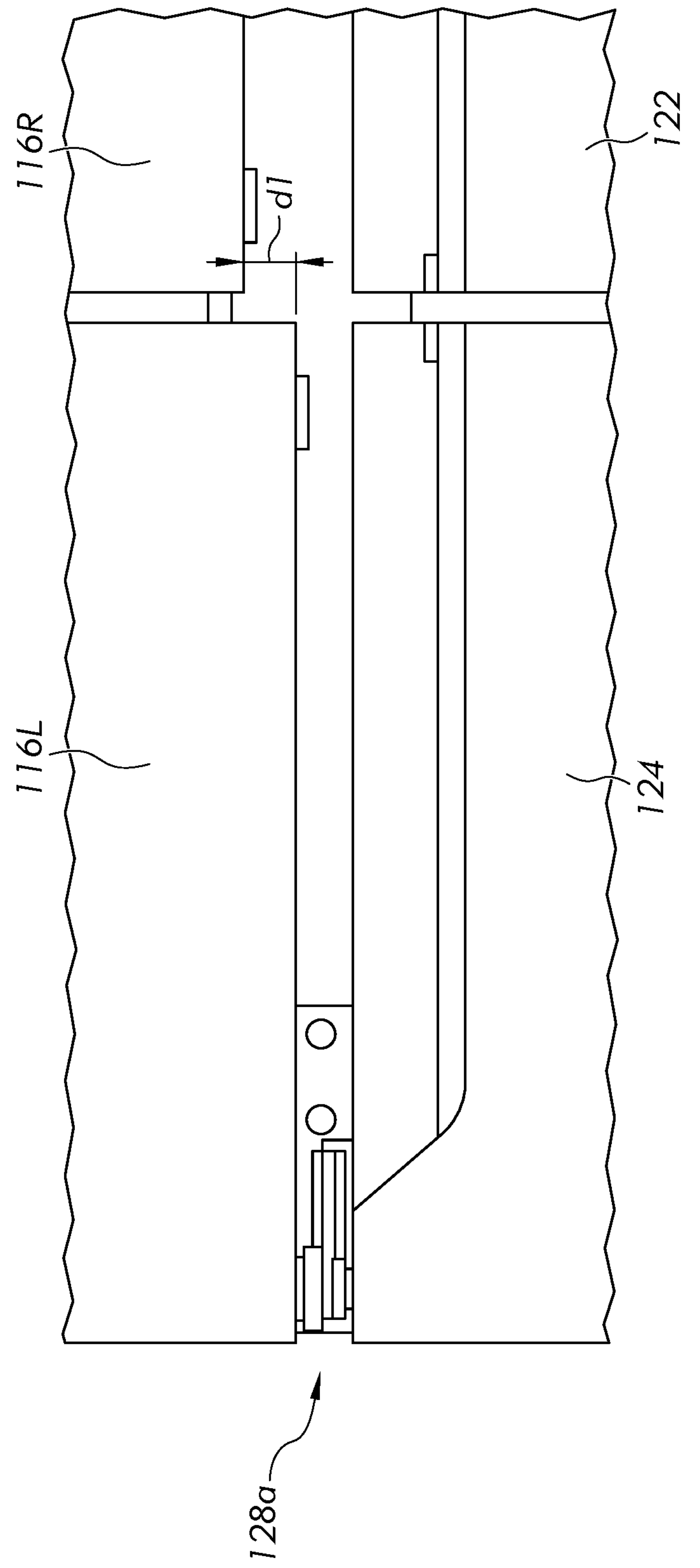
FIG. 7 is an enlarged, partial front view of the refrigerator depicted in FIG. 1, wherein the pair of doors are in an unaligned position.

When the left-hand and right-hand fresh food doors 116L, 116R are initially installed on the refrigerator 100, it is common for said doors to be unaligned with one another (e.g., one door is positioned higher than the other). This results in an unaesthetic appearance and often requires substantial time for an installer to correct. The middle hinges (i.e., the first and second middle hinges 128*a*, 128*b*) discussed above permit an installer and/or an end user to correct any misalignment in an efficient and effortless manner. With respect to FIG. 7, the left-hand fresh food door 116L is shown as being in a first, unaligned position wherein the left-hand fresh food door 116L is positioned a first distance d1 below the right-hand fresh food door 116R. That is, a bottom surface of the left-hand fresh food door 116L is vertically spaced (i.e., via the first distance d1) from a bottom surface of the right-hand fresh food door 116R. Preferably, via the vertical adjustment provided by each the first and second middle hinges 128*a*, 128*b*, this distance d1 can be reduced to zero, or nearly zero.

With respect to FIG. 8A, when the left-hand fresh food door 116L is located in the first position (i.e., an unaligned orientation with respect to the right-hand fresh food door 116R), the shaft 174 of the left-hand fresh food door 116L is positioned such that a distal end 174*a* of the shaft 174 is located a second distance d2 from the top of the first pivot pin 146. In order to correct the unaligned orientation of the left-hand fresh food door 116L, the tool T is inserted into the gap 140 defined between the first and second arms 136, 138 of the first middle hinge 128*a* and engages the pair of planar sides 166 of the adjustment screw 162.

Figure 9:
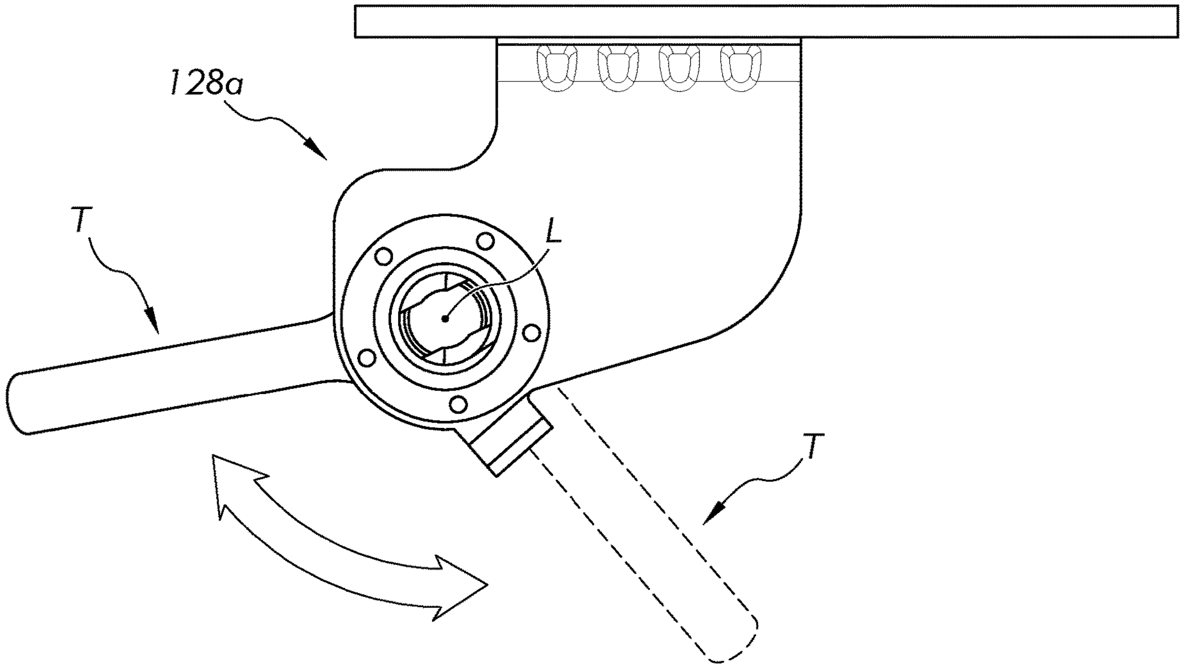
FIG. 9 is a top view of the middle hinge wherein the tool engages the adjustment screw.

Subsequently, as shown in FIG. 9, the tool T is rotated about a longitudinal axis L of the first inner channel 150. With respect to FIG. 8B, as the tool T rotates, the adjustment screw 162 likewise rotates and thus translates axially along the longitudinal axis L of the first inner channel 150 of the first pivot pin 146. Being a threaded connection, the user can rotate the adjustment screw 162 either clockwise or counterclockwise to translate the adjustment screw 162 upwards or downwards, as desired. The user can continue to rotate the tool T until the left-hand fresh food door 116L and the right-hand fresh food door 116R are aligned (as depicted in FIG. 1). Specifically, as shown in FIG. 8B, the shaft 174 of the left-hand door 116L has been displaced (via translation of the adjustment screw 162) such that the distal end 174*a* of the shaft 174 is located a third distance d3 from the first pivot pin 146. The third distance d3 equates to a sum of the first distance d1 (i.e., the vertical distance separating the respective bottoms of the left and right-hand fresh food doors 116L, 116R, when the left-hand fresh food door 116L is in the first, unaligned position) and the second distance d2 (i.e., the distance between the distal end 174*a* of the shaft 174 and the first pivot pin 146, when the left-hand fresh food door 116L is in the first, unaligned position). Although a single adjustment has been described above, it is contemplated that the user can separately adjust either or both of the adjustment screws in the first and second middle hinges 128*a*, 128*b*, respectively, to adjust the relative heights of both the left and right-hand fresh food doors 116L, 116R until they are aligned, as desired.

Accordingly, the above-discussed middle hinges (i.e., the first and second middle hinges 128*a*, 128*b*) permit an installer/user to quickly and efficiently adjust a height of one of the left and right-hand fresh food doors 116L, 116R, in order to correct any misalignment therebetween. The alignment correction occurs when the left and right-hand fresh food doors 116L, 116R are installed upon the refrigerator cabinet (i.e., without the need to completely remove either door from the refrigerator 100) and without the use of any special tools (i.e., a common wrench can be used to rotate the adjustment screw 162).

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A refrigerator door hinge that pivotably supports first and second doors of a refrigerator for independent movement, the first and second doors being vertically aligned with and separated from one another, the refrigerator door hinge comprising:

a bracket;

first and second arms extending outwards and away from the bracket, the first and second arms being arranged such that a gap is formed therebetween;

a first pivot pin for pivotably supporting the first door, the first pivot pin being disposed adjacent the first arm and having a first inner channel formed therein;

a second pivot pin for pivotably supporting the second door, the second pivot pin being disposed adjacent the second arm; and an adjustment screw positioned within the first inner channel of the first pivot pin and extending at least partially into the gap defined between the first and second arms, the adjustment screw being configured to directly contact and engage a shaft of the first door and configured to translate a distance within the first inner channel so as to also translate the shaft of the first door the same distance in order to vertically adjust a height of the first door.

2. The refrigerator door hinge of claim 1, the first arm being vertically aligned with the second arm, and the first and second arms having first and second through-holes formed respectively therein.

3. The refrigerator door hinge of claim 2, the first and second through-holes being coaxial.

4. The refrigerator door hinge of claim 3, the first arm being formed integral with the bracket, and the second arm being attached to the first arm.

5. The refrigerator door hinge of claim 2, the first and second arms each having first and second opposing surfaces, wherein the second surface of the first arm faces the first surface of the second arm.

6. The refrigerator door hinge of claim 5, the first and second pivot pins each comprising a hollow body with a flange disposed adjacent a terminal end thereof.

7. The refrigerator door hinge of claim 6, wherein the flange of the first pivot pin contacts the first surface of the first arm, and wherein the flange of the second pivot pin contacts the first surface of the second arm and the hollow body of the second pivot pin extends through the second through-hole formed in the second arm.

8. The refrigerator door hinge of claim 2, the second pivot pin having a second inner channel formed therein, wherein the adjustment screw is configured to translate within the first inner channel and/or the second inner channel so as to vertically translate the shaft of the first door in order to adjust the height of the first door.

9. The refrigerator door hinge of claim 8, the adjustment screw comprising a pair of planar sides that are configured to be engaged by a tool such that, when the tool rotates, the adjustment screw likewise rotates and translates within an axial direction of the first pivot pin.

10. The refrigerator door hinge of claim 9, wherein the gap is sized and shaped so as to receive the tool and permit the tool to rotate when the tool engages the pair of planar sides of the adjustment screw.

11. The refrigerator door hinge of claim 1, wherein the refrigerator further comprising third and fourth doors being vertically aligned with and separate from one another, wherein the third and fourth doors are horizontally aligned with the first and second doors, respectively.

12. The refrigerator door hinge of claim 11, further comprising a second door hinge configured to pivotably support the third and fourth doors.

13. The refrigerator door hinge of claim 1, wherein the refrigerator comprising a storage compartment being defined by a liner comprising a top wall, a bottom wall, a pair of opposing side walls, and a rear wall, wherein the first and second arms extend outwards and away from the storage compartment in a direction opposite from the rear wall of the liner.

14. A method of adjusting a height of a first refrigerator door that is vertically aligned with and separated from a second refrigerator door when both said refrigerator doors are pivotally attached to a single refrigerator, both of the first and second refrigerator doors being pivotably supported by a door hinge comprising first and second arms having first and second pivot pins, respectively, that extend outwards and away from one another, wherein the first and second pivot pins pivotably support the first and second refrigerator doors, respectively, the method comprising:

inserting a tool within a gap formed between the first and second arms;

engaging the tool with an adjustment screw that extends at least partially into the gap and that is at least partly positioned within an inner channel of the first pivot pin; and rotating the tool about a longitudinal axis of the inner channel of the first pivot pin to rotate and translate the adjustment screw a distance within the inner channel, the screw directly contacting a shaft of the first refrigerator door to also translate the shaft the same distance within the inner channel in order to vertically adjust a height of the first refrigerator door relative to a height of the second refrigerator door.

15. The method of adjusting the height of the first refrigerator door of claim 14, wherein the step of engaging the tool with the adjustment screw further comprises placing the tool adjacent a pair of planar sides formed into a circumferential wall of the adjustment screw.

16. A refrigerator door hinge that pivotably supports first and second doors of a refrigerator for independent movement, the first and second doors being vertically aligned with and separated from one another, the refrigerator door hinge comprising:

a bracket;

first and second arms extending outwards and away from the bracket, the first and second arms being arranged such that a gap is formed therebetween;

the first arm being vertically aligned with the second arm, and the first and second arms having first and second through-holes formed respectively therein;

a first pivot pin for pivotably supporting the first door, the first pivot pin being disposed adjacent the first arm and having a first inner channel formed therein;

a second pivot pin for pivotably supporting the second door, the second pivot pin being disposed adjacent the second arm; and an adjustment screw positioned within the first inner channel of the first pivot pin, the adjustment screw being configured to engage a shaft of the first door and configured to translate within the first inner channel so as to translate the shaft of the first door in order to vertically adjust a height of the first door;

the second pivot pin having a second inner channel formed therein, wherein the adjustment screw extends into the gap defined between the first and second arms and is configured to translate within the first inner channel and/or the second inner channel so as to vertically translate the shaft of the first door in order to adjust the height of the first door;

the adjustment screw comprising a pair of planar sides that are configured to be engaged by a tool such that, when the tool rotates, the adjustment screw likewise rotates and translates within an axial direction of the first pivot pin; and wherein the gap is sized and shaped so as to receive the tool and permit the tool to rotate when the tool engages the pair of planar sides of the adjustment screw.

* * * * *